United States Patent Office 2,702,588
Patented Feb. 22, 1955

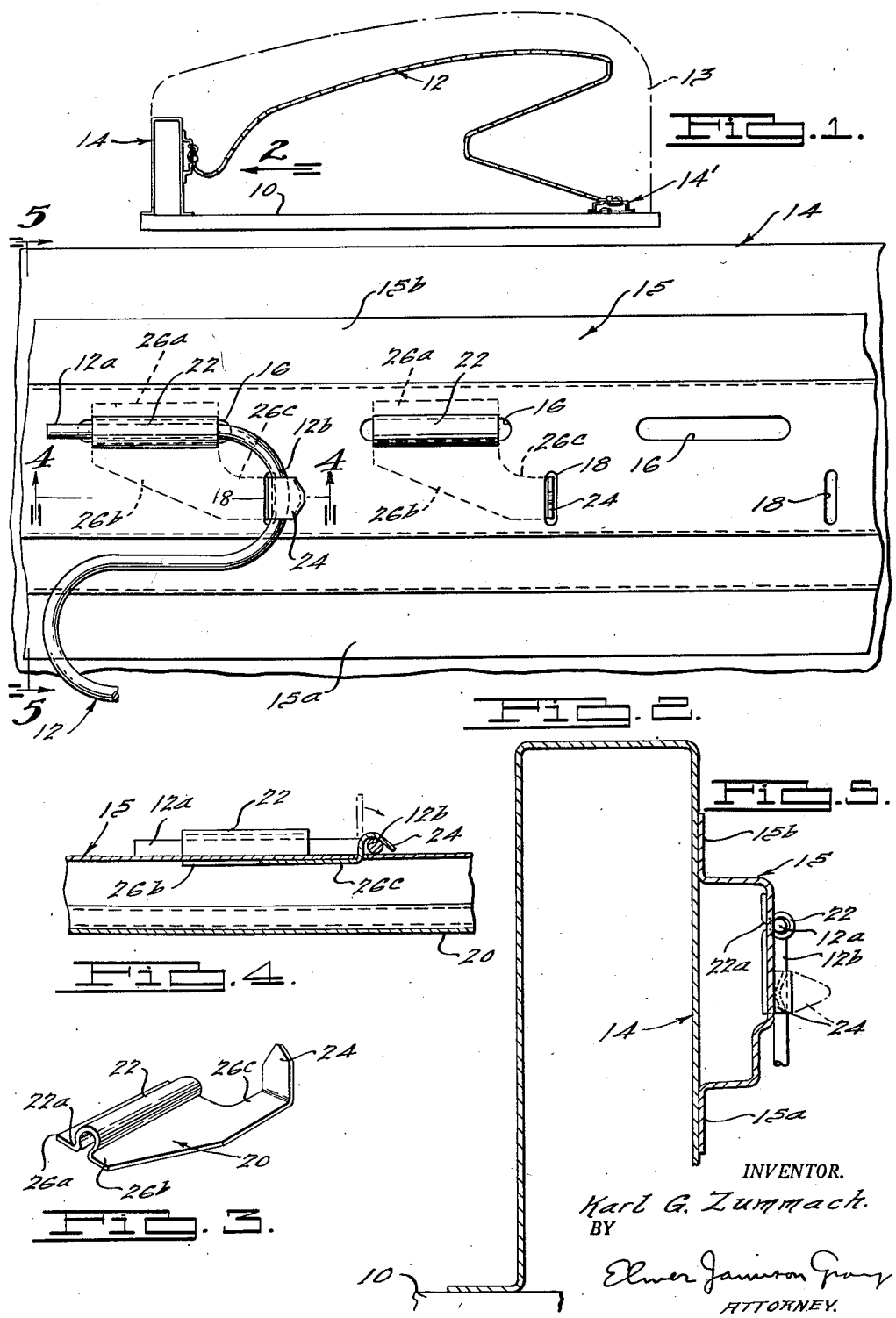

2,702,588

SEAT CUSHION SPRING STRUCTURE

Karl G. Zummach, Detroit, Mich., assignor to Briggs Manufacturing Co., Detroit, Mich., a corporation of Michigan Application August 27, 1949, Serial No. 112,757

10 Claims. (Cl. 155—179)

The present invention relates to improvements in a seat and cushion spring structure, and in particular to improved means for securing the cushion spring, as for example for an automobile seat, to the seat frame.

It has been customary in the construction of seat cushion springs, such as for automobile seats or the like, to employ a plurality of sinuous spring wire members arranged side by side and formed to the general contour of the seat or back thereof. The ends of the convoluted spring wire members are suitably secured to the seat frame or the upright back frame of the seat. After installation of the spring members the seat and back are suitably padded and upholstered. In such practice considerable expense has been entailed in securing the ends of the spring members to the seat frame and frequently comparatively complex seat frame structures have been required for satisfactory results.

An object of the present invention is to provide an improved simplified means for securing the ends of a seat spring to the seat frame or other supporting structure, which means are subject to economical manufacture and which facilitate and simplify the assembly of the seat structure, particularly the attachment between the spring members and the seat frame or other support.

Another object of the invention is to provide an improved cushion seat structure including a fastener clip or retainer member adapted to engage the seat frame or other support and having a generally tubular or loop-like portion adapted to project through an opening in the seat frame or support into position to permit the end of the spring wire to extend thereinto and be retained under tension against withdrawal.

A further object of the invention is to provide a fastener member or retainer clip of the foregoing kind in which the projecting retainer portion for the end of the wire is adapted to yield when forced through the opening in the seat frame or support and thereafter to spring back to normal shape so as to grip the edges of the opening and prevent withdrawal therefrom. Thus, the clip may be snapped into position and retained against dislodgement by reason of the frictional engagement of the wire retaining portion with the edges of the opening in the support.

Still another object is to provide a seat structure of the foregoing character including a clip member having a body portion adapted to abut the seat frame or other support on one side thereof and having a loop or hollow rib-like portion adapted to pass through an opening in the frame or support and to receive a portion of the seat spring within the loop on the side of the frame or support opposite the body portion of the clip, whereby displacement of the clip from the opening in the frame or support is prevented. A further object is to provide on the body of the clip a tab adapted to pass through an opening in the frame or support and to be bent over a portion of the seat spring so as to anchor the spring within said loop portion against removal or displacement.

Other objects of this invention will appear in the following description and appended claims, reference being had to the accompanying drawings forming a part of this specification wherein like reference characters designate corresponding parts in the several views.

Fig. 1 is an end elevation of an automobile cushion seat constructed in accordance with the present invention, the upholstery material being indicated in phantom.

Fig. 2 is a fragmentary enlarged side elevation taken in the direction of the arrow 2 in Fig. 1.

Fig. 3 is a perspective view of a retaining clip embodying the present invention.

Fig. 4 is a fragmentary horizontal section through the seat spring and retaining clip, taken in the direction of the arrows along the line 4—4 of Fig. 2.

Fig. 5 is a fragmentary vertical section taken in the direction of the arrows along the line 5—5 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the automobile cushion seat indicated in Fig. 1 comprises a suitable base 10 and a plurality of sinuous heavy wire spring members 12 spaced side by side across the entire width of the seat, each spring member extending continuously from rear to the front of the seat and shaped to conform to the general sectional contour of the seat structure in accordance with conventional practice. The springs 12 are secured at their forward and rearward ends respectively to supports, generally indicated at 14 and 14', mounted on the base 10 and are covered by a suitable upholstery material 13 indicated in phantom.

As viewed in side elevation in Fig. 1, each spring member 12 extends forward from the support 14 in inclined manner to form an arched seat portion. From the forward portion of the seat each spring 12 extends downward and rearward and then downward and outward to the support 14'. The arched contour of the seat portion of the spring members 12 is maintained by their resiliency which provides sufficient resistance to downward displacement to support the weight of a person seated thereon. By virtue of the resiliency of the spring members 12 it will be apparent that considerable force is exerted tending to spread or separate their ends secured to the supports 14 and 14'.

The support 14 in the present instance comprises an inverted channel member extending transversely the width of the seat structure across the base 10 of the frame. This channel member terminates at the lower edges thereof in outturned flanges for attachment to the base. Suitably mounted upon the inner side of the support 14 is a channel member 15 which also extends the full width of the seat, this channel member being provided with outturned flanges 15a and 15b for attachment to the support 14. The channel member 15 is formed with a series of spaced elongated slots 16 extending in alignment transversely of the seat. In addition to the slots 16 the channel member 15 is also formed with a series of spaced vertically extending slots 18, each slot 18 being associated with one of the adjacent horizontal slots 16 for the purpose of mounting a wire retaining clip, as hereinafter described.

The rear end of each individual seat spring 12 is fastened to the channel member 15 by means of a retainer member or clip formed of sheet metal and comprising a flat base or body portion 20 fabricated to provide wire retaining portions 22 and 24 constructed to extend through an associated pair of slots 16 and 18 respectively. The wire retaining portion 22, which may be pressed or rolled from the metal of the base 20, is in the form of a hollow rib or rounded channel-like projection providing a constricted neck 22a at the juncture of the rib 22 with the base 20. Thus, the wire retaining rib or channel-like projection 22 separates the base into coplanar flange portions 26a and 26b. The portion 26b of the base has a lateral extension 26c which is bent up at right angles to form the wire retaining portion 24 which is in the nature of a projecting tab or prong.

The maximum width of the wire retaining rib 22 transverse to its longitudinal axis is preferably slightly greater than the width of the slot 16, and the length of the rib, as shown in Fig. 2, is somewhat less than the length of the slot 16. The rib 22, however, has sufficient resiliency so that it may be forced through the slot 16 by contracting or springing together the opposed portions of the neck 22a. After the rib has been forced through the slot 16 the opposed neck portions 22a will spring apart so as to engage the edges of the slot 16 and retain the rib in position against withdrawal. The position of the associated slot 18 is such that when the retaining rib is snapped into position within the slot 16 the tab 24 will project through the slot 18 with the base 20 of the clip engaging the inner face of the channel member 15. After the clips 20 have been installed on the channel member 15 in the manner above described, the channel member may be secured to the side of the support 14 in any suitable manner such as by spot welding or by screws or other fastening means (not shown).

After installation of the clips 20 on the channel member 15 and the attachment of the latter to the support 14, the rear ends of the spring members 12 may be readily attached to the channel member 15 through the medium of the clips. This is accomplished by passing the straight end portion 12a of each spring member through the rib or projecting loop portion 22 until the adjacent curved or sinuous portion 12b of the spring member abuts against the projecting tab 24, the tab at this time extending at right angles to the face of the channel member 15 in the manner shown in dotted lines in Fig. 4. Thereafter the tab is bent down over the wire portion 12b by using a hammer or other tool so as to clinch the wire portion 12a securely in position to the channel member 15 in the manner shown in full lines in Fig. 4. It will be understood that the rear ends of all of the spring members 12 of the seat are secured to the channel 15 through the medium of the clips 20 in the manner above described. Also, it will be understood that the forward ends of the spring members 12 may be secured to the channel member 14' in the same manner through the medium of retainer clips constructed and mounted as above described.

From the foregoing it will be seen that the present invention provides a simple means for attaching the ends of the spring wire members of the cushion to the seat frame, enabling installation of these members to be accomplished with a minimum expenditure of time. The retainer clips are easily mounted on the seat frame members and when in place are frictionally held within the slots against dislodgement. After the ends of the spring wire members have been inserted into the projecting hollow retainer ribs on the clips, not only are the wire members securely retained in place to withstand forces incident to compression of the springs but also the clips are locked to the frame against any possibility of dislodgement. Furthermore, by clinching the projecting tabs over portions of the wire members adjacent the retainer ribs these wire members are securely held against any possibility of withdrawal of the ends of the wire members from the retainer ribs.

Although the present invention has been shown as applied to a seat cushion spring, it will be understood that the back cushion of the seat structure may also be constructed in the same manner as herein shown and described.

I claim:

1. A spring retainer for a convoluted cushion spring comprising a channel of resilient material, the sides of the channel converging to a reduced channel mouth opening in one direction and terminating in oppositely flared body portions perpendicular to said one direction, the body portion at one side of the channel terminating in a tab adapted to be formed around said spring and projecting oppositely from said one direction at a location spaced laterally from the channel and axially beyond one end of the latter.

2. In a cushion structure, a support, a wire cushion spring having at one side of said support a pair of adjacent spring portions disposed angularly with respect to each other, said support having a pair of spaced openings therein adjacent said spring portions respectively, and a retainer clip comprising a body portion engaged with the other side of said support opposite said one side, said body portion having spaced spring retainer portions extending through said openings and embracing said spring portions at spaced localities.

3. In a cushion structure, a support, a wire cushion spring having at one side of said support a pair of adjacent spring portions disposed angularly with respect to each other, said support having a pair of spaced openings therein adjacent said spring portions respectively, and a retainer clip comprising a body portion engaged with the other side of said support opposite said one side, said body portion having spaced loop and tab portions extending in spaced relation from said other side through said openings, said loop portion having one of said spring portions therein at said one side, the tab portion being folded over the other of said spring portions at said one side.

4. In a cushion structure, a support, a wire cushion spring having at one side of said support a pair of adjacent spring portions disposed angularly with respect to each other, said support having a pair of spaced openings therein adjacent said spring portions respectively, and a retainer clip comprising a body portion engaged with the other side of said support opposite said one side, said body portion having spaced loop and tab portions extending in spaced relation through said openings from said other side and embracing said pair of spring portions at said one side, said loop portion being oversize with respect to the opening therefor in said support and being joined to said body portion by a neck of reduced size with respect to said loop portion, said loop portion being resiliently yieldable for passage through the latter opening and said neck being located in said latter opening.

5. In a cushion structure, a support, a wire cushion spring having at one side of the support an end portion and a second portion disposed adjacent the end portion and angularly thereto, said support having a pair of spaced openings therein adjacent said end portion and second portion respectively, a retainer clip having a body portion engageable with the support at the other side thereof opposite said one side, said body portion having a pair of spaced spring retainer portions insertable through said openings from said other side, one of said retainer portions comprising a loop adapted to confine said end portion of the spring therein at said one side, the other retainer portion comprising a tab adapted to be formed around said second portion of the spring to confine the latter at said one side.

6. In a cushion structure, a support, a wire cushion spring having at one side of the support an end portion and a second portion disposed adjacent the end portion and angularly thereto, said support having a pair of spaced openings therein adjacent said end portion and second portion respectively, a retainer clip having a body portion engageable with the support at the other side thereof opposite said one side, said body portion having a pair of spaced spring retainers insertable through said openings from said other side and adapted to embrace said end portion and second portion at spaced localities.

7. In a cushion structure, a support, a wire cushion spring having at one side of the support an end portion and a second portion disposed adjacent the end portion and angularly thereto, said support having a pair of spaced openings therein adjacent said end portion and second portion respectively, a retainer clip having a body portion engageable with the support at the other side thereof opposite said one side, said body portion having a pair of spring retainers insertable through said openings from said other side, one of said retainers comprising a tab connected at one end to said body portion and adapted to be formed over said second portion of the spring at said one side, the other retainer comprising a loop adapted to confine said end portion of the spring therein and being oversize with respect to the opening therefor in the support, said loop having a reduced neck and being resiliently yieldable for passage through the latter opening to locate said neck therein.

8. In a cushion structure, a support, a sinuous wire cushion spring having at one side of the support an end portion extending transversely of the length of the spring and a second portion spaced from said end portion extending longitudinally of the length of the spring, said support having a pair of spaced openings therein adjacent said end portion and second portion respectively, a retainer clip having a body portion engaged with the support at the other side thereof opposite said one side, said body portion having a pair of spring retainer loops extending through said openings from said other side, one loop extending through the opening adjacent said end portion comprising a channel portion parallel to said end portion and having the latter confined therein at said one side, the opposed channel sides of said channel portion at said one side being spaced more than the width of said latter opening and converging to a reduced neck located within said latter opening, the opposed sides of said neck being resiliently yieldable toward each other for passage of said channel portion through said latter opening and flaring oppositely from each other at said other side to comprise said body portion, the other loop comprising a tab connected at one end to said body portion at said other side and being formed over said second portion of the spring at said one side.

9. In a cushion structure, a support, a wire cushion spring at one side of said support, a retainer clip comprising a channel loop at one side of said support having an end portion of said spring confined within said loop, the opposed channel sides of said loop converging to a reduced channel neck located within an opening in said support and terminating in flared portions directed away from the channel neck on the other side of said support, the spacing between said channel sides at said one side of said support being greater than the width of said opening and said channel sides being resiliently yieldable toward each other for passage through said opening, one of said flared portions having a spring retainer portion spaced from said loop and extending through a second opening in said support, said spring retainer portion embracing a portion of said spring disposed angularly to said end portion at said one side of said support.

10. In a cushion structure, a support, a wire cushion spring at one side of said support, a retainer clip comprising a channel loop at one side of said support having an end portion of said spring confined within said loop, the opposed channel sides of said loop converging toward said support, at least one channel side extending from said one side of said support through an opening therein and terminating in a flared body portion on the other side of said support, the spacing between said channel sides at said one side of said support being greater than the width of said opening and said channel sides being resiliently yieldable toward each other for passage through said opening, said flared portion having a spring retainer portion spaced from said loop and extending through a second opening in said support and embracing a portion of said spring disposed angularly to said end portion at said one side of said support.

References Cited in the file of this patent

UNITED STATES PATENTS

| | | |
|---|---|---|
| 2,072,562 | Lee | Mar. 2, 1937 |
| 2,124,048 | Bank | July 19, 1938 |
| 2,241,909 | Hoven et al. | May 13, 1941 |
| 2,260,190 | Neely | Oct. 21, 1941 |
| 2,526,184 | Williams et al. | Oct. 17, 1950 |